United States Patent [19]

Peterson

[11] 4,447,541

[45] May 8, 1984

[54] METHODS FOR DECONTAMINATING SOIL

[75] Inventor: Robert L. Peterson, East Syracuse, N.Y.

[73] Assignee: Galson Research Corporation, East Syracuse, N.Y.

[21] Appl. No.: 501,620

[22] Filed: Jun. 6, 1983

[51] Int. Cl.³ ........................................... D06M 16/00
[52] U.S. Cl. ..................... 435/264; 435/170; 435/243; 435/874; 549/349; 568/755; 71/903
[58] Field of Search ................. 71/1, 11, 27, 903, 6; 435/170, 243, 253, 262, 264, 874; 549/349, 359; 568/755

[56] References Cited

U.S. PATENT DOCUMENTS

| | | | |
|---|---|---|---|
| 2,107,650 | 2/1938 | Smith et al. | 260/154 |
| 2,126,648 | 8/1938 | Lofton, Jr. et al. | 260/623 |
| 2,509,245 | 5/1950 | Nikawitz et al. | 260/623 |
| 2,644,015 | 6/1953 | Bartlett | 260/623 |
| 2,692,899 | 10/1954 | Kolka et al. | 260/623 |
| 2,799,713 | 7/1957 | Widiger, Jr. et al. | 260/623 |
| 2,803,670 | 8/1957 | Galat | 260/623 |
| 2,812,366 | 11/1957 | Rosen | 260/623 |
| 2,952,702 | 9/1960 | Galat | 260/473 |
| 3,347,937 | 10/1967 | Carr et al. | 260/623 |
| 3,417,150 | 12/1968 | Bondy et al. | 260/623 |
| 3,481,991 | 12/1969 | Cohen | 260/623 |
| 3,755,470 | 8/1973 | Michaels et al. | 260/623 |
| 4,327,027 | 4/1982 | Howard et al. | 549/349 |
| 4,337,368 | 6/1982 | Pytlewski et al. | 568/730 |
| 4,351,978 | 9/1982 | Hatano et al. | 585/469 |
| 4,401,569 | 8/1983 | Jhaveri et al. | 435/262 X |

FOREIGN PATENT DOCUMENTS 647339 2/1972 U.S.S.R. .............................. 435/262

OTHER PUBLICATIONS

Verschueren, Handbook of Environmental Data on Organic Chemicals, Van Nostrand Reinhold Co., N.Y., N.Y., 1977 pp. 236, 237, 362, 363, 511, 604, 605.

Primary Examiner—Ferris H. Lander
Attorney, Agent, or Firm—Le Blanc, Nolan, Shur & Nies

[57] ABSTRACT

A reagent mixture is admixed with soil to first desorb and then hydrolyze and thereby increase the biodegradability of a toxic or otherwise hazardous polyhalogenated organic compound with which the soil is contaminated. Essential constituents of the reagent mixture are: (1) an alkali metal hydroxide, an alkali metal hydroxide/alcohol or alkali metal hyroxide/glycol mixture, or an alkoxide; and (2) a sulfoxide catalyst. The hydrolyzed compounds can be biologically degraded into compounds which pose little if any hazard to the environment or its inhabitants by naturally occurring or artifically introduced Pseudomonas sp. and other microorganisms with adjustment of soil pH (and perhaps orther parameters) to provide a viable environment for the bacteria being carried out after the chemical treatment if inoculation with bacterial cultures is employed. If a mixture of non-biodegradable and biodegradable contaminants is present, a preliminary biodegradation step can be optionally used to rid the contaminated area of the latter before hydrolysis of the contaminated soil with the reagent mixture is undertaken.

27 Claims, No Drawings

METHODS FOR DECONTAMINATING SOIL

In one aspect the present invention relates to novel, improved methods for increasing the biodegradability of halogenated organic soil contaminants in which the halogenated compound is converted in situ into partially or completely dehalogenated compounds that are susceptible to biological attack. And, in a second aspect, the present invention relates to novel, improved methods for decontaminating soil which is contaminated with a polyhalogenated organic compound by first hydrolyzing the compound to increase its biodegradability and then biologically decomposing the hydrolyzed reaction product or products.

Numerous polyhalogenated organic compounds pose definite hazards to the environment and to public health. Many are toxic to both flora and fauna, physiologically active, and carcinogenic. Polyhalogenated organic compounds also bioaccumulate in the food chain process. Consequently, as an example, a human eating the flesh or drinking the milk of an animal which has fed on plants grown in contaminated soil may ingest the compound to his detriment.

Also, such compounds may be leached from the soil in which they are present and enter streams, rivers, lakes, and similar environments where they likewise pose a considerable hazard, see Tabak et al, Biodegradability Studies with Organic Priority Pollutant Compounds, Journal WPCF, Vol. 53, No. 10, October 1981, pp. 1503–1518.

Exemplary of the polyhalogenated compounds which possess dangerous properties such as those just discussed are polychlorinated biphenyls and dioxins, other highly chlorinated aromatics such as hexachlorobenzene and polychlorinated phenols, and polyhalogenated aliphatics such as carbon tetrachloride and trichloroethylene.

In our industrial society polyhalogenated organic compounds are widely used as solvents, heat transfer fluids, and fire retardants and for other purposes in part because of their stability and insolubility in water. These potentially hazardous polyhalogenated compounds have been and continue to be introduced into soil in significant quantities because of improper disposal of banned, spent, and used chemicals; accidental spills; transportation accidents; etc.

Because of their hazardous nature, the existence of polyhalogenated compounds in soil is of considerable concern, especially as their stability and insolubility results in such compounds persisting in hazardous form for virtually indefinite periods of time.

Several methods of disposing of polyhalogenated organic compounds have been proposed. One, approved by the United States Environmental Protection Agency for polychlorinated biphenyls (PCBs), is incineration. Where the compound exists as a soil contaminant, this approach is prohibitively expensive because of the volume of material involved. Also, incineration poses a number of other problems such as the need for complex and expensive equipment to remove corrosive and toxic substances from the incinerator effluent and the disposal of toxic ash (see U.S. Pat. No. 4,337,368 issued June 29, 1982, to Pytlewski et al for Reagent and Method for Decomposing Halogenated Organic Compounds).

Evacuation and transfer of the contaminated soil to a "secure" landfill is another technique that can be employed to dispose of hazardous polyhalogenated compounds. This, too, can be economically impractical. Also, the compounds persist and pose a potential threat because the integrity of the landfill may not remain inviolate.

Ultraviolet and hydrothermal decomposition and radiolysis of polyhalogenated hydrocarbons have also been proposed. Such techniques are ineffective and/or economically impractical even without the presence of soil, and the degradation products may not be significantly less hazardous than the original substances (see U.S. Pat. No. 4,351,978 issued Sept. 28, 1982, to Hatano et al for Method for the Disposal of Polychlorinated Biphenyls).

Also, the decontamination of environments polluted with polyhalogenated organics by bacterial attack has been investigated (see Tabak et al, supra, and Shiaris and Sayler, Biotransformation of PCB by Natural Assemblies of Freshwater Microorganisms, Envir. Sci. Tech., Vol. 16, No. 6, 1982, pp. 367–369). This approach is effective with less highly chlorinated compounds such as PCB 1221 and PCB 1232 which have chlorine contents of 21 and 32 percent, respectively. This technique is not useful with more highly chlorinated compounds such as PCB 1242 (42% Cl), PCB 1254 (54% Cl), or PCB 1260 (60% Cl). All of these PCBs still exist in large quantities.

That bacterial attack is not an effective technique for decomposing highly halogenated organics is apparent from Verschueren, Handbook of Environmental Data on Organic Chemicals, Van Nostrand Reinhold Company, New York, N.Y., 1977, pp. 236, 237, 362, 363, 511, 604, 605. The author reported the following with respect to the biodegradation (ring disruption of several halogenated organics by Pseudomonas sp. (culture containing 200 mg/liter at 30° C.):

| Chemical | % Biodegradation |
| --- | --- |
| Hexachlorobenzene | 0% in 120 hr. |
| Pentachlorophenol | 7% in 120 hr. |
| 1 2 4-Trichlorobenzene | 92% in 120 hr. |
| 2,4-Dichlorophenol | 100% in 96 hr. |

Several chemical processes for decomposing polyhalogenated organic compounds and thereby rendering them relatively harmless have also been proposed. Among these are: chlorolysis, catalytic hydrogenation-dechlorination, molten salt reactionsazardous Waste, March 1980, pp. 72–76.

The heretofore proposed chemical techniques for rendering polyhalogenated organics harmless have a number of serious drawbacks and limitations that make them impractical even where the compound does not exist in the form of a soil contaminant. These include: the need for expensive reagents and high temperatures and pressures; the problems engendered in handling extremely reactive materials such as metallic sodium; and high energy requirements. Because of these requirements and limitations, the heretofore proposed chemical processes for degrading highly chlorinated organic compounds are impractical in circumstances where the compound exists as a soil contaminant.

A brief report (C&EN, Oct. 4, 1982) does state that a sodium/polyethylene gluconate complex has been successfully used to decrease the concentration of a PCB of unspecified chlorine content in soil samples under laboratory conditions. However, aside from the fact that the experiment may have involved a less highly chlorinated compound such as PCB 1221 or 1232 and that the reagent is apparently made from metallic sodium, it is significant that a rate of degradation of only ca. 1.4 percent per day was obtained.

In contrast, I have achieved degradation rates as high as 21.2 percent per day of a highly halogenated soil contaminant(PCB 1248) under field conditions by using the novel process disclosed herein for converting highly halogenated organics into relatively harmless compounds.

That process, moreover, does not have the drawbacks of those previously proposed techniques discussed above including the experimental process identified in the proceeding paragraph. It uses relatively inexpensive reagents, can be carried out at ambient temperature and pressure, is not energy intensive, and does not involve the handling of highly reactive substances. My novel technique for decomposing polyhalogenated organics also has the unique advantage that it can be used to at least partially dehalogenate such compounds in situ in soil in reasonable periods of time. The resulting degradation products are typically much more water soluble than the original compounds and can be more readily metabolized by soil bacteria into relatively harmless compounds whereas the original, highly halogenated and insoluble, compounds may be subject to bacterial attack only on a limited basis, if at all (see Verschueren, supra).

In my novel process for converting polyhalogenated organic soil contaminants to relatively harmless compounds, a reagent mixture of an alkaline constituent and a sulfoxide catalyst is intimately mixed with the contaminated soil (the combination of the just identified constituents is referred to herein as a reagent mixture even though the constituents may be applied separately and even sequentially to the contaminated soil). The reagent mixture effects a desorption of the polyhalogenated contaminant from the soil particles on which it is adsorbed and subsequent dehalogenation of the contaminant.

This step of applying the reagent mixture to, and mixing it with, the contaminated soil can, but does not have to be, carried out in situ. That it can be is a unique advantage of my invention of obvious importance.

The exact dehalogenation path or paths which will occur depend in large part on the nature of the halogenated organic contaminant present in the soil and the particular alkali constituent that is used to decompose it. As one example, trichlorobenzene reacts with a potassium hydroxide/benzyl alcohol/dimethyl sulfoxide (DMSO) mixture in the following series of reactions:

| DMSO | | |
|---|---|---|
| $\phi$—CH$_2$—OH + KOH | $\rightleftarrows$ | $\phi$—CH$_2$—OK + H$_2$O |
| $\phi$—CH$_2$OK + $\phi$Cl$_3$ | $\rightarrow$ | Cl$_2$$\phi$OCH$_2$$\phi$ + KCl |
| Cl$_2$$\phi$OCH$_2$$\phi$ + H$_2$O | $\rightarrow$ | Cl$_2$$\phi$OH + $\phi$CH$_2$OH, and |
| Cl$_2$$\phi$OH + KOH | $\rightarrow$ | Cl$_2$$\phi$OK + H$_2$O |

Dichlorophenol and its potassium salt are significantly more biodegradable than the parent trichlorobenzene.

Following the dehalogenation of the contaminant, the less highly halogenated and therefore more readily metabolizable reaction products (see the data from Verschueren reproduced above) are decomposed into relatively harmless compounds by bacterial action.

Naturally occuring mixed populations of microorganisms can be used for this purpose. In that technique for applying the principles of my invention, the chemically treated soil is, without further ado, simply allowed to stand idle until biodegradation of the dehalogenated contaminants by microorganisms migrating into the treated area has reduced the contaminants to an acceptable level. This technique has the advantage that the chemical dehalogenation reactions will continue for a lengthy period of time (most probably measured in years) until the soil becomes naturally neutralized. Thus, this approach affords the opportunity for the greatest degree of dehalogenation and, consequently, for soil decontamination to the lowest level. However, it does require an extended period of time.

In a second technique for applying the principles of my invention, the chemical dehalogenation treatment of the contaminated soil is followed by inoculation of that soil with any of several appropriate species of heterotrophic bacteria (see Shiaris et al, supra). Exemplary of the suitable microorganisms are Pseudomonas sp. (see the Verschueren Handbook identified above).

Bacteria such as Pseudomonas sp. thrive best in soil with an appropriate pH (typically in the more-or-less neutral range) and a balanced supply of nitrogen, phosphorus and carbon. Because of its alkaline constituent, however, the addition of the reagent mixture to the contaminated soil usually results in its having a higher than optimum pH. Thus, after the chemical treatment of the contaminated soil (desorption plus dehalogenation is completed, it is normally advantageous to lower the pH of the soil before inoculating it with the microorganisms selected to decompose the products produced by the chemical soil treatment.

Usually, this can most economically be accomplished by spraying the effected area with a dilute acid solution and then raking or tilling the soil, for example, to uniformly distribute the acid. Suitable acids include sulfuric and acetic.

Hydrochloric acid may also be used. However, the potassium chloride salt produced by reaction of that acid with the alkaline constituent of the reagent mixture may inhibit bacterial growth to some extent.

Other techniques for lowering soil pH, such as the use of acid fertilizers, are well-known in the literature and may be used in particular cases if economically advantageous.

Before the contaminated soil is inoculated with bacteria, it may also prove advantageous to adjust the nitrogen: phosphorus: carbon balance of the nutrients available to the bacteria from the contaminated soil. This ratio, like pH, has a decided effect on the ability of the bacteria to biodegrade the dehalogenated organic compounds present in the soil being treated.

Commercial fertilizers can be mixed into the soil being treated for this purpose. Either solid or liquid fertilizers can be employed; the choice of fertilizer will normally be dictated by the economics of a given situation.

This second decontamination technique has the advantage of being faster than the first (perhaps days or weeks versus years). On the other hand, it may prove more expensive because of the cost of the bacterial cultures with which the contaminated soil is inoculated, and decontamination may not be as complete because the neutralization (reduction in pH) of the soil needed to provide an optimal environment for the subsequently introduced bacteria halts the dehalogenation reactions.

A third option for decontaminating soils in accord with the principles of the present invention involves preliminary decontamination of the affected area followed by the second of the chemical biological treatment sequences discussed above (chemical treatment then introduction of Pseudomonas sp. or other bacteria into the chemically treated area).

This third option is useful where a mixture of biodegradable and non-biodegradable contaminants such as dichlorophenol and hexachlorobenzene are present. The preliminary biodegradation step can in such circumstances be utilized to rid the contaminated soil of all or part of the biodegradable contaminants and thereby reduce the amount of reagent mixture required for, and cost of, the subsequent chemical treatment of the soil.

In most cases the second of the three above-disclosed methods of soil decontamination will prove to be the most advantageous, in large part because of the speed with which the decontamination process can be completed.

In the chemical treatment steps of my novel processes for decontaminating soils poisoned with polyhalogenated organics, the reagent mixture is mixed with the contaminated soil in an amount providing at least two moles of alkaline constituent per mole of contaminant.

Typically, a higher concentration of the reagent mixture will be employed as the rate of reaction between the contaminant and the alkaline constituent of the reagent mixture is a function of the rate at which the latter is applied with the economics of a given situation imposing an upper limit on application rate.

Those alkaline constituents which are useful in my process are the alkali metal hydroxides, mixtures of monohydric and dihydric alcohols and those hydroxides, and alkoxides.

The preferred hydroxide, whether used alone or in admixture with an alcohol, is potassium hydroxide. Of the two readily available (in quantity) and inexpensive alkali metal hydroxides (the other is sodium), it gives much the faster reaction rates. However, sodium hydroxide can also be employed as can lithium, cesium, and rubidium hydroxides. The last three hydroxides, though, are currently too expensive to be practical.

Both mono- and dihydric alcohols can be used in those cases where a hydroxide/alcohol mixture is selected as the alkaline constituent.

Of the monohydric alcohols, benzyl alcohol is preferred because it is an extremely powerful reagent for my purposes, yet has a relatively low molecular weight. Other aromatic alcohols can also be employed as can the higher aliphatic alochols such as octanol although the latter does not perform as well as benzyl alcohol. Lower aliphatic alcohols—notably methyl alcohol—perform very poorly.

Operable dihydric alcohols include ethylene glycol, propylene glycol, and polyethylene glycols (PEG's) particularly those having a molecular weight of 200–600.

Alkoxides, as a class, appear to be operable for my purposes. Preferred because of their activity and commercial availability are potassium tert butoxide and potassium tert-pentoxide. These compounds have the drawback of being expensive, however.

Generally speaking, sulfoxides are, as a class, useful as catalysts in the novel processes disclosed herein. However, those of higher molecular weight are more expensive on a mole equivalent basis; and they tend to have higher melting points so that they freeze faster (and become inoperable) than those of lower molecular weight.

Dimethyl sulfoxide (DMSO) is the preferred sulfoxide catalyst. Sulfolane (tetramethylene sulfone) is an example of another sulfoxide catalyst that can be employed although it has a higher melting point than DMSO (27° C., 80.6° F. versus 18.5° C., 65.3° F.). Consequently, there are fewer days per year in which sulfolane exists in a catalytically active, non-solid state.

The proportion of catalyst to alkaline constituent in the reagent mixture is not critical as the activity of the latter is increased in proportion to the amount of catalyst present up to an as yet undefined limit where so much sulfoxide is present in the reaction mixture that it inhibits the requisite contact between the alkaline constituent of the reagent mixture and the adsorbed polyhalogenated contaminant.

Ratios of alkaline constituent to sulfoxide catalyst in the range of 1:4 to 4:1 are preferred in most cases for an optimum balance of potentiating effect and cost (all ratios and percentages set forth herein are on a weight basis).

The selection of a reagent for a specific application is determined by a variety of factors. Alkoxides, hydroxide/glycol, and hydroxide/alcohol mixtures are substantially stronger bases than hydroxides, but are also more expensive. The alkoxide/sulfoxide mixtures tend to be much more viscous than aqueous hydroxide/sulfoxide mixtures, which may reduce the rate of extraction of the organic contaminant from the contaminated soil (dehalogenation of the contaminant cannot take place without desorption).

On the other hand, the stronger bases will react faster with most halogenated organics and will dehalogenate organics which are not affected by hydroxide solutions. For example, with PCB 1254 (a PCB averaging 54 percent chlorine by weight), a KOH/PEG 400/DMSO mixture will react 10–20 times faster than a 50% KOH/DMSO mixture in pure solution (PEG 400 is polyethylene glycol with a molecular weight of 400). However, in soil applications, an equal cost addition of KOH/DMSO solution will often perform better than the KOH/PEG/DMSO mixture because of the lower viscosity of the hydroxide/sulfoxide mixture and because a greater volume of hydroxide/sulfoxide may be used for a given cost of application due to the lower cost of the hydroxide/sulfoxide mixture. Thus, selection of the most cost effective reagent mixture depends on a balancing of relative rates of extraction and reaction.

The soil and reagent mixture (or solution) must be well mixed to provide maximum contact between the reagent solution and the halogenated organic. Mixing may be done on site with a rototiller, harrow, or similar device. It may also be desirable to mix the soil more than once to aid the desorption of the organic contaminant into the reaction mixture.

The reagent solution is allowed to react with the halogenated contaminant for several days or weeks or longer depending on the amount of reagent solution, the reaction rate of the particular halogenated organic involved, the soil temperature, and the degree of reaction required. In some cases it may be desirable to cover the soil with a rain cover of plastic or similar material to avoid dilution of the reagent solution by rainwater.

U.S. Pat. No. 3,481,991 issued Dec. 2, 1969, to Cohen for Preparation of Chlorinated Hydroxy Compounds discloses a reaction that resembles one that can be employed in the novel soil decontamination processes discussed above in that a chlorinated compound is reacted with an alkali metal hydroxide in the presence of a sulfoxide to hydrolyze the compound. However, the patentee only discloses that the reaction can be used to produce pentachlorophenol from hexachlorobenzene. Moreover, Cohen teaches that the reaction must be carried out at an elevated temperature which is not done in my novel process; and there is of course no suggestion that the reactants disclosed in the patent could be employed to first desorb and then dehalogenate contaminants adsorbed on soil particles as is requisite in the soil decontaminating processes disclosed herein.

The decontamination of soil containing highly halogenated contaminants differs significantly from the dehalogenation of organic halides in liquids as is done in the Cohen process in that the organic soil contaminant is adsorbed on a surface and is not available for reaction. Thus, a soil reagent must be capable of desorbing the halogenated organic from the soil as well as halogenating the desorbed organic contaminant. This factor makes it impossible to determine the effectiveness of a soil reagent by testing its performance in liquid solutions. For example, KOH/PEG 1000 reagent is an excellent performer in high temperature liquid applications. However, it is not very useful in treating contaminated soils. Contrarily, the 50% KOH/DMSO reagent, which is a relatively poor reagent for liquid use under ambient conditions, has given outstanding reaction rates of 21.2 percent per day reduction of contaminant concentration in soil at one half the cost of the KOH/PEG 400 reagent.

From the foregoing, it will be apparent to the reader that one important and primary object of the present invention resides in novel, improved methods for ridding soil of highly halogenated organic contaminants.

An equally important and also primary object of my invention is to provide novel methods for decreasing the halogen content of highly halogenated organic compounds in situ in soil and thereby making them more susceptible to biodegradation.

Other more specific but nevertheless important objects of the invention reside in the provision of methods as described in the preceding objects:
which are effective in reasonable periods of time;
which can be carried out in soil in situ;
which are cost effective;
which can be carried out at ambient temperature and pressure;
which do not involve the handling of dangerous or extremely reactive substances;
which are not energy intensive.

Other important objects and additional features and advantages of my invention will be apparent to the reader from the foregoing, the appended claims, and the following examples which are intended only to illustrate and not restrict the scope of that which I claim as my invention.

EXAMPLE I

A 5'×5'×1' test plot containing PCB 1248 was infused with 5 gallons of 50% KOH, followed by 7 gallons of DMSO. The reagents were then mixed with the soil in this area with a rototiller. The test plot was covered with transparent plastic to avoid dilution of the reagents by rainwater.

Laboratory analysis of the contaminated soil gave the following results:

| Time | PCB Concentration (ppm) |
|---|---|
| Before Reagent Addition | 125 |
| After Addition (2 hours) | 52 |
| 10 Days After Addition | 15 |
| 19 Days After Addition | 3.2 |

Overall, there was a 97.4 percent reduction in the concentration of PCB in the contaminated soil and an average 17.5%/day reduction in the contaminant level over the 19 day period.

EXAMPLE II

Nine grams of soil containing 310 ppm of PCB 1242 was mixed with 0.46 milliliters of 50% potassium hydroxide in water and 0.7 milliliters of DMSO. Analysis after 14 days at room temperature indicated that there had been a 40.5 to 45.0% reduction of the PCB level in the soil.

EXAMPLE III

The soil in a 5'×5'×1' test plot containing a PCB of ca. 48% chlorine content was mixed as described in Example I with 5 gallons of 50% KOH, 5 gallons of benzyl alcohol, and 10 gallons of DMSO. Laboratory analysis of the contaminated soil gave the following results:

| Time | PCB Concentration (ppm) |
|---|---|
| Before Reagent Addition | 111 |
| After Addition (2 hours) | 98 |
| 10 Days After Addition | 22 |
| 19 Days After Addition | 1.2 |

In this test, there was a 98.9 percent reduction of the PCB in the soil, and the average daily reduction of the PCB content was 21.2 percent.

EXAMPLE IV

Soil contaminated with 1233 ppm of pentachlorophenol was mixed with 3% of a KOH solution (50% KOH in water) and 1.2% DMSO. Analysis after 5 days showed no detectable pentachlorophenol in the sample (detection limit of 10 ppm).

EXAMPLE V

A reagent mixture containing 100 microliters of 50% KOH, 100 microliters of PEG 400, and 800 microliters of DMSO was mixed with nine grams of soil and one gram of oil containing PCB 1254. The resulting mixture was covered, held 8 days at ambient condition, and analyzed. This showed that the PCB concentration in the soil had dropped from 240 ppm to 185 ppm, an overall decrease of 22.9% and an average daily decrease of 3.2%.

In each case the degradation products are more subject to subsequent biological attack than the parent compounds because they are less highly halogenated. This is made evident by the data in those parts of the Verschueren Handbook identified above (the exact nature of the degradation products generated in the procedures summarized in Examples I-V was not ascertained because this information would not have been of that much value).

My invention has been disclosed above primarily with reference to highly chlorinated organic compounds. This is not intended to limit the scope of protection to which I consider myself entitled as that invention can equally well be employed to rid contaminated soils of other highly halogenated, toxic or otherwise undesirable organic materials. One example of these is the polybrominated biphenyls (PBBs). Such compounds are known to enter the food chain by being taken up by plants that are subsequently ingested by foraging animals.

Furthermore, the invention may be embodied in specific forms other than those disclosed above without departing from the spirit or essential characteristics thereof. The embodiments of the invention disclosed above are therefore to be considered in all respects as illustrative and not restrictive. The scope of the invention is instead indicated by the appended claims, and all changes which come within the meaning and range of equivalency of the claims are intended to be embraced therein.

What is claimed and desired to be secured by Letters Patent is:

1. A method of converting a highly halogenated organic soil contaminant to a compound which is less highly chlorinated and thereby more soluble and more metabolizable by microorganisms, said method comprising the step of: admixing with the soil contaminated by the highly halogenated organic contaminant an effective amount of a reagent which is capable of at least partially dehalogenating said organic contaminant, said reagent comprising an alkali constituent and a sulfoxide catalyst and said alkali constituent being an alkali metal hydroxide, a mixture of an alkali metal hydroxide and an alcohol, or an alkoxide.

2. A method according to claim 1 wherein the alkali constituent of the reagent mixture is potassium hydroxide.

3. A method according to claim 1 wherein the alkali constituent of the reagent mixture is a mixture of an alkali metal hydroxide and benzyl alcohol.

4. A method according to claim 1 wherein the alkali metal hydroxide is potassium hydroxide.

5. A method according to claim 1 wherein the alkali constituent of the reagent mixture is a mixture of an alkali metal hydroxide and a polyethylene glycol.

6. A method according to claim 5 wherein the alkali metal hydroxide is potassium hydroxide and the polyethylene glycol has a molecular weight in the range of 200 to 600.

7. A method according to claim 1 wherein the alkali metal constituent of the reagent mixture is an alkoxide and said alkoxide is potassium tertbutoxide or potassium tertpentoxide 8. A method according to claim 1 wherein the sulfoxide catalyst of the reagent mixture is dimethyl sulfoxide.

9. A method according to claim 1 wherein the ratio of alkali constituent to catalyst in said reagent mixture is in the ratio of 1:4 to 4:1 parts by weight.

10. A method according to claim 1 wherein the reagent mixture is admixed with the contaminated soil in an amount providing at least two moles of alkali metal constituent per mole of polyhalogenated organic compound in said soil.

11. A method of decontaminating soil by biologically decomposing a polyhalogenated organic compound with which said soil is contaminated, said method comprising the step of admixing with said soil an effective amount of a reagent mixture which is capable of at least partially dehalogenating said organic compound and thereby increasing its biodegradability, said mixture comprising an alkali constituent and a sulfoxide catalyst and said alkali constituent being an alkali metal hydroxide, a mixture of an alkali metal hydroxide and an alcohol, or an alkoxide.

12. A method of decontaminating soil according to claim 11 wherein the alkali constituent of the reagent mixture is potassium hydroxide.

13. A method of decontaminating soil according to claim 11 wherein the alkali constituent of the reagent mixture is a mixture of an alkali metal hydroxide and benzyl alcohol.

14. A method of decontaminating soil according to claim 13 wherein the alkali metal hydroxide is potassium hydroxide.

15. A method of decontaminating soil according to claim 11 wherein the alkali constituent of the reagent mixture is a mixture of an alkali hydroxide and a polyethylene glycol.

16. A method of decontaminating soil as defined in claim 15 wherein the alkali metal hydroxide is potassium hydroxide and the polyethylene glycol has a molecular weight in the range of 200 to 600.

17. A method of decontaminating soil according to claim 11 wherein the alkali metal constituent of the reagent mixture is an alkoxide and said alkoxide is potassium tertbutoxide or potassium tertpentoxide.

18. A method of decontaminating soil according to claim 11 wherein the sulfoxide catalyst of the reagent mixture is dimethyl sulfoxide.

19. A method of decontaminating soil according to claim 11 wherein the reagent mixture is applied to the contaminated soil in situ.

20. A method of decontaminating soil according to claim 11 which also includes the step of, subsequent to the mixing of the reagent mixture with the soil, inoculating said soil with at least one specie of bacteria which is effective to biologically decompose said at least partially dehalogenated organic compound.

21. A method of decontaminating soil as defined in claim 20 which includes the step of, subsequent to the mixing of the reagent mixture with the contaminated soil, lowering the pH of that soil to a level which is effective to promote the capability of the inoculated bacteria in the contaminated soil for degrading halogenated organic contaminants.

22. A method of decontaminating soil as defined in claim 20 which includes the step of, subsequent to the mixing of the reagent mixture with the soil, adjusting the carbon: nitrogen: phosphorous ratio of the nutrients in the contaminated soil to one which is effective to promote the capability of the contaminated bacteria in the contaminated soil for degrading the halogenated organic contaminants.

23. A method of decontaminating soil as defined in claim 20 wherein the bacteria with which the soil is inoculated is Pseudomonas sp.

24. A method of decontaminating soil according to claim 11 wherein the ratio of alkali constituent to catalyst in said reagent mixture is in the ratio of 1:4 to 4:1.

25. A method of decontaminating soil according to claim 11 wherein the reagent mixture is admixed with the soil being decontaminated in an amount providing at least two moles of alkali metal constituent per mole of polyhalogenated organic compound in said soil.

26. A method of decontaminating soil as defined in claim 11 wherein the hydrolyzed reaction products of the contaminants in the soil treated with the reaction mixture are subsequently decomposed by naturally occurring bacteria migrating into the treated area.

27. A method of decontaminating soil as defined in claim 11 wherein the soil contains both a biodegradable contaminant and a non-biodegradable contaminant and wherein said soil is, before the admixing of the reagent mixture therewith, inoculated with at least one specie of bacteria which is effective to biologically decompose the biodegradable contaminant.

* * * * *

UNITED STATES PATENT AND TRADEMARK OFFICE
CERTIFICATE OF CORRECTION

PATENT NO. : 4,447,541

DATED : May 8, 1984

INVENTOR(S) : Robert L. Peterson

It is certified that error appears in the above-identified patent and that said Letters Patent is hereby corrected as shown below:

In the abstract, line 14, change "orther" to --other--.

Column 2, cancel the paragraph beginning with line 45, and substitute the following paragraph --

Several chemical processes for decomposing polyhalogenated organic compounds and thereby rendering them relatively harmless have also been proposed. Among these are: chlorolysis, catalytic hydrogenation-dechlorination, molten salt reactions, alkali metal reduction in "solvated electron" solvents, decomposition with a sodium metal complex, and reaction with an alkali metal alcoholate or an alkaline constituent/alcohol mixture. These techniques are described in the Hatano et al and Pytlewski patents cited above; in U.S. patents Nos. 4,327,027 issued April 27, 1982, to Howard et al for Chemical Detoxification of Chlorinated Aromatic Compounds and 4,377,471 issued March 22, 1983, to Brown et al for Method for Removing Polychlorinated Biphenyls from Transformer Oil and in Pytlewski et al, The Reaction of PCB's with Sodium, Oxygen, and

UNITED STATES PATENT AND TRADEMARK OFFICE
CERTIFICATE OF CORRECTION

PATENT NO. : 4,447,541

DATED : May 8, 1984

INVENTOR(S) : Robert L. Peterson

It is certified that error appears in the above-identified patent and that said Letters Patent is hereby corrected as shown below:

Polyethylene Glycols, Proceedings of the Sixth Annual Research Symposium on the Treatment of Hazardous Waste, March 1980, pp. 72-76.

Signed and Sealed this

Twenty-third Day of October 1984

[SEAL]

Attest:

Attesting Officer

GERALD J. MOSSINGHOFF

Commissioner of Patents and Trademarks